United States Patent [19]
Lamonica

[11] Patent Number: 4,671,132
[45] Date of Patent: Jun. 9, 1987

[54] HYDRO LAZY TONGS ENERGY BOOSTER

[76] Inventor: Mercurio Lamonica, 7214 - 17th Ave., Brooklyn, N.Y. 11204

[21] Appl. No.: 785,534

[22] Filed: Nov. 18, 1985

[51] Int. Cl.⁴ .............................................. G05G 1/04
[52] U.S. Cl. ...................................... 74/521; 74/110; 248/277
[58] Field of Search ...................... 74/110, 521, 594.1, 74/594.3; 248/277

[56] References Cited

U.S. PATENT DOCUMENTS

| | | | |
|---|---|---|---|
| 422,086 | 2/1890 | Lewis | 74/594.3 |
| 666,837 | 1/1901 | Wittmann | 74/594.1 |
| 862,639 | 8/1907 | Fefferis | 74/521 |
| 2,698,753 | 1/1955 | Kellman et al. | 74/521 |
| 2,745,216 | 5/1956 | Stanetzki | 74/521 |
| 2,865,523 | 12/1958 | Morrison | 74/521 |
| 2,951,574 | 9/1960 | Craig | 74/521 |
| 3,754,516 | 8/1973 | Van Gompel | 74/521 |
| 3,886,807 | 6/1975 | Ellis | 74/521 |
| 4,041,799 | 8/1977 | Teti | 74/521 |
| 4,151,758 | 5/1979 | Natalie | 74/521 |

FOREIGN PATENT DOCUMENTS 21203  7/1920  France .................................. 74/521

Primary Examiner—Gary L. Smith
Assistant Examiner—Vinh Luong
Attorney, Agent, or Firm—Anthony J. Casella; Gerald E. Hespos

[57] ABSTRACT

A hydraulically powered lazy tong apparatus is provided for efficiently converting hydraulic power to rotational mechanical power. The apparatus may be employed independently or as part of another system that inherently requires the flow of hydraulic fluid. The apparatus comprises a pair of hydraulically powered piston and cylinder assemblies which are operatively connected to opposed ends of at least one lazy tong assembly. The lazy tong assembly preferably is connected by levers to a plurality of additional lazy tong assemblies. By this arrangement, the hydraulic power of the piston and cylinder assemblies is converted to linear mechanical movements, with the relative speed and power of that movement being determined in part by the dimensions of the lazy tong assemblies and the levers therebetween. The linear mechanical movement generated by the lazy tong assemblies is converted to rotational movement through a rack and pinion or chain apparatus. The rotational movement can be used to drive another apparatus or to function as a booster for another apparatus having a primary energy source for rotational movement.

13 Claims, 24 Drawing Figures

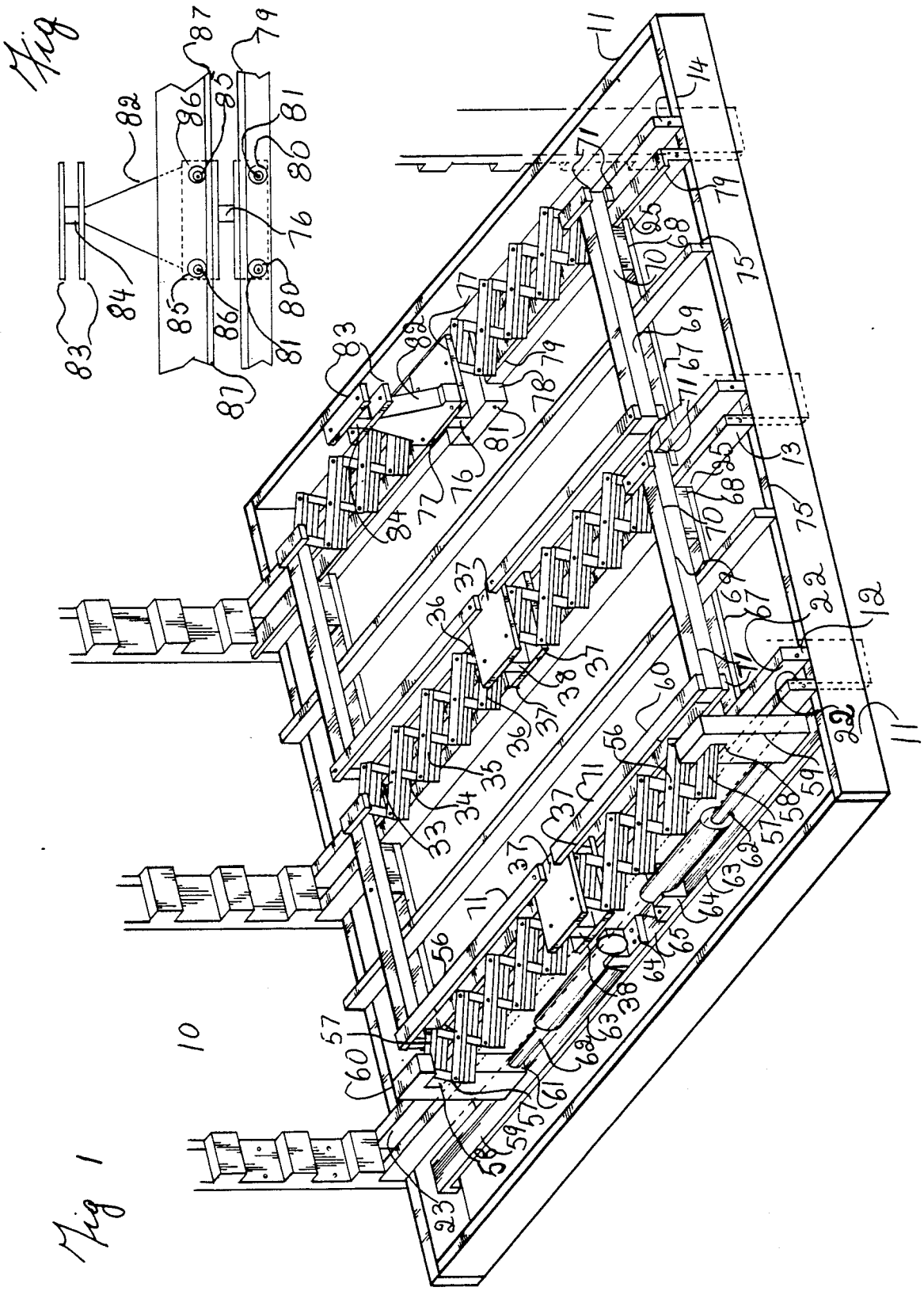

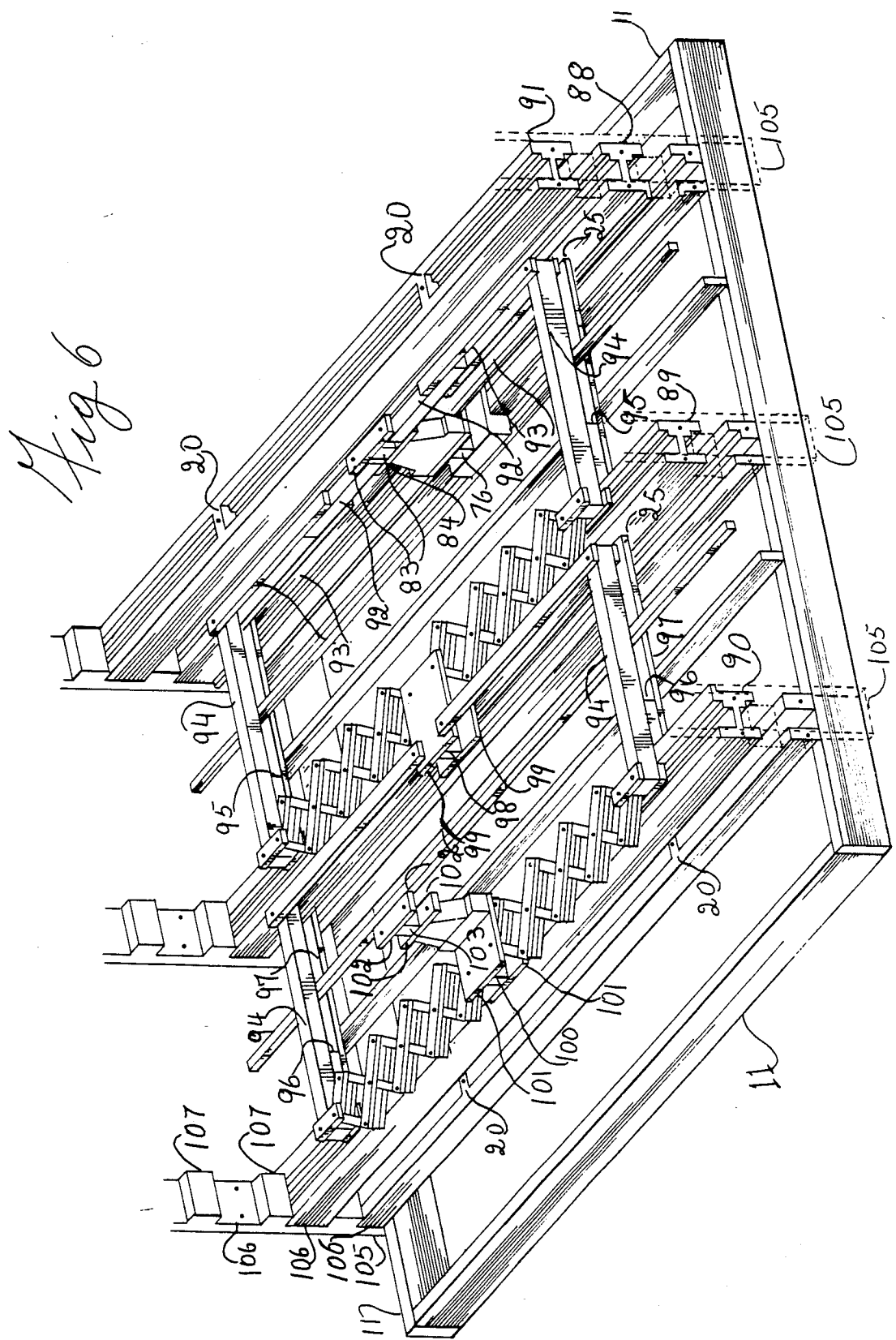

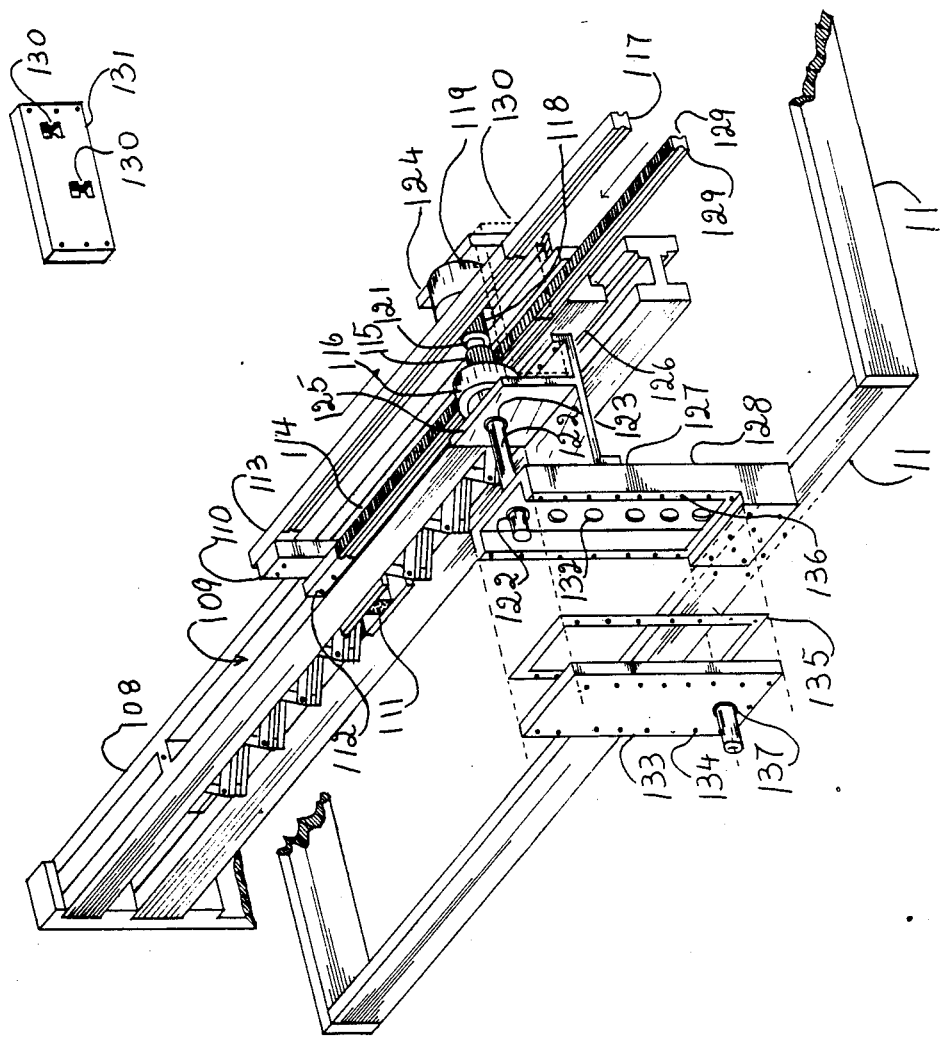

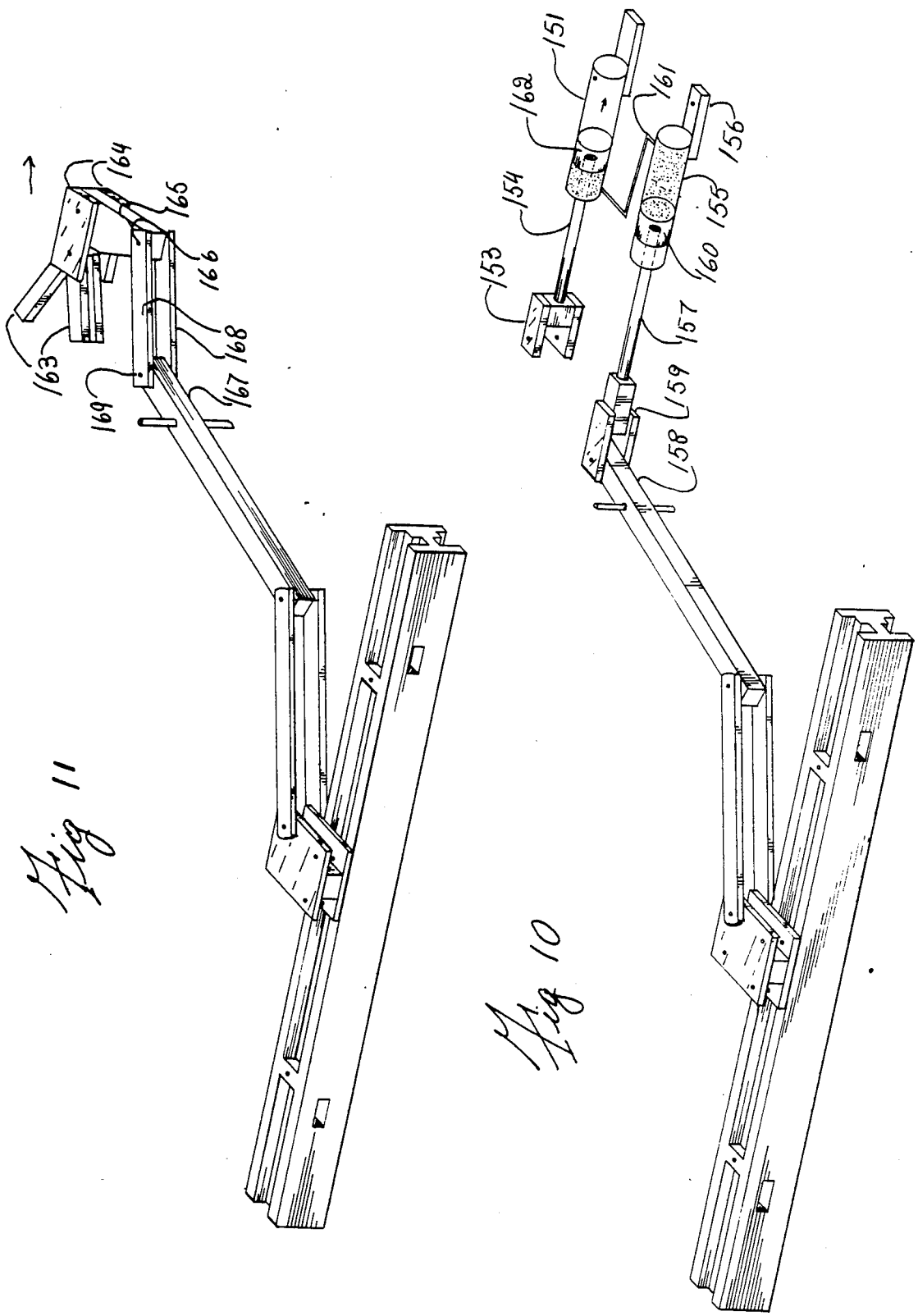

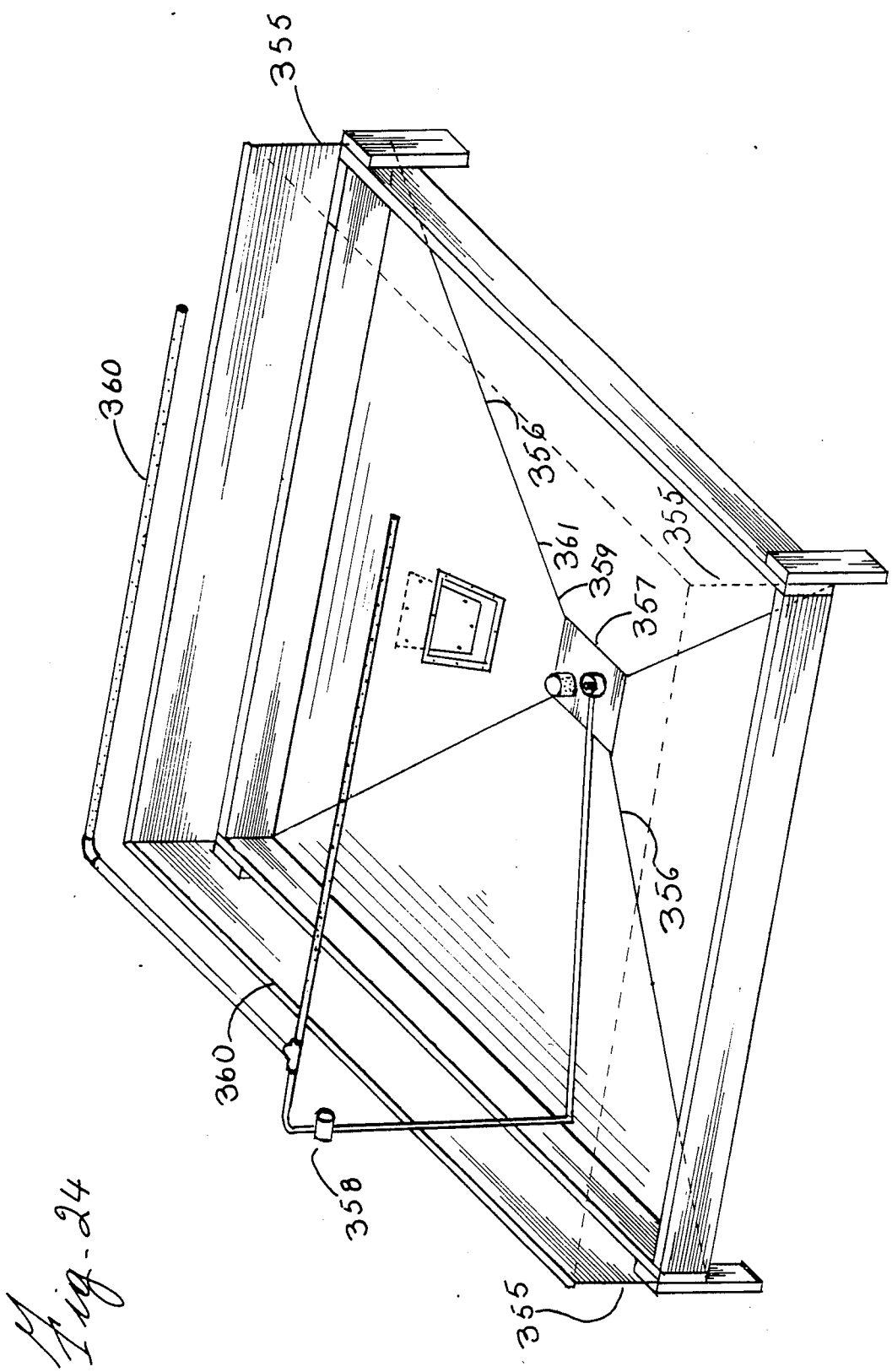

HYDRO LAZY TONGS ENERGY BOOSTER

SUMMARY OF THE INVENTION

The Hydro Lazy Tongs Energy Booster is a mechanism which utilizes the power of an engine for its basic function, and the movement of a sequence of sets of lazy tong arms, in combination with levers, for developing a greater power.

A set of lazy tong arms, comprising of one extended arm and one compressed arm, are joined together by a block and plates, is mounted in channeled tracks. Each arm is actuated by the piston rod of a cylinder connected to the half tongs of the first set of lazy tong arms. Each piston rod will pull on the first anchored cross section of each arm, extending one arm and closing the other.

An eccentric hydraulic pump, driven by an engine, will force hydraulic fluid into an accumulator capable of holding the fluid under pressure.

The pressurized fluid from the accumulator, controlled by a valve, will actuate the first piston connected to the closed lazy tong arm.

The thrust of the piston will exert a pull on the first cross section of the arm, extending it and closing the other, establishing, in this manner, a back and forth movement of the block and plates joining the two arms of the first set.

The length of this movement, related to the number of the cross sections forming the arms, is sufficient enough to pull on a lever whose effort arm is greater than the length of its resistance.

The system of the combined lazy tong arms and levers makes it possible for a sequence of many levers to work upon each other in a way that the resistance of each lever will pull on the effort arm of the next lever for a number of times.

The back and forth movement of the block and plates of the last set of lazy tong arms is converted into rotation and speed by a gear rack, or loops of silent chains, engaged to a gear train system.

The power of the mechanical system will be approximately equal to the power applied to the first actuating piston multiplied by (the length of the effort of a lever, divided by the length of the resistance) and the product mulitplied by the leverage for a number of times, given by the number of levers used in the mechanism, minus friction and resistance.

Consequently, the output of the mechanical system is greater than the power required to compress fluid in the accumulator.

Only one stroke of the actuating piston is necessary for a complete cycle of the mechanism. Therefore, giving the accumulator a volume greater than the volume of the actuating cylinder, the mechanism can function on the power held in the accumulator until most of the consumption of the fluid. During which time, an eccentric pump, connected to the gear train system, can supply fluid and maintain the accumulator fully loaded.

This invention relates to energy and, more specifically, to a mechanism driven by the power of an engine.

A principle object of the present invention is to provide a mechanism that will function as an engine on a given energy, with an output greater than the energy needed for its function.

Another object is to provide a mechanism, booster of energy, that will function as an engine on a given energy stored into an accumulator.

Still another object is to provide a moveable, engine type mechanism with a great, clean, mechanical power that can be manufactured in different sizes.

BRIEF DESCRIPTION OF THE DRAWINGS

These and many other objects will be readily evident upon a study of the object and the following specifications and accompanying drawings wherein:

FIG. 1 is a perspective view of the first stage of the present invention in its functional structure. It represents the first actuating set of lazy tong arms mounted on a base, and connected to the driving piston rods and linked by levers to the second and third set of lazy tong arms on the first level.

FIG. 2 is a fragmentary schematic front view, taken from FIG. 1, showing a modified block and plates with bearings mounted right under the rim of a single track and over the rim of a superposed double track.

FIG. 6 is a perspective view showing the transfer of power and motion from the first level to the second level and mounting of the tracks in mounting spacer bars.

FIG. 7 is a perspective view of the last set of lazy tong arms mounted between two double tracks to convert the movement of the last block and plates into rotation and speed.

FIG. 8 is a fragmentary perspective view of a plate taken from FIG. 7.

FIG. 10 is a perspective view of a modified system for applying the thrust of the levers on the half tongs of the lazy tong arms. The thrust, herewith, is applied on a piston to expell hydraulic fluid from one cylinder into a second one; therefore, causing an inward thrust upon the second piston and a pull on the half tongs.

FIG. 11 is a perspective view of another modified system for applying the thrust of the levers upon the half tongs of the lazy tong arms; herewith, the thrust of the levers exert a push on a block and a pull of the half tongs mounted within the plates.

FIG. 24 is an oil pan with a pyramidal bottom and integral vertical walls to contain the lazy tong mechanical system for lubrication and safety.

Figure 5:
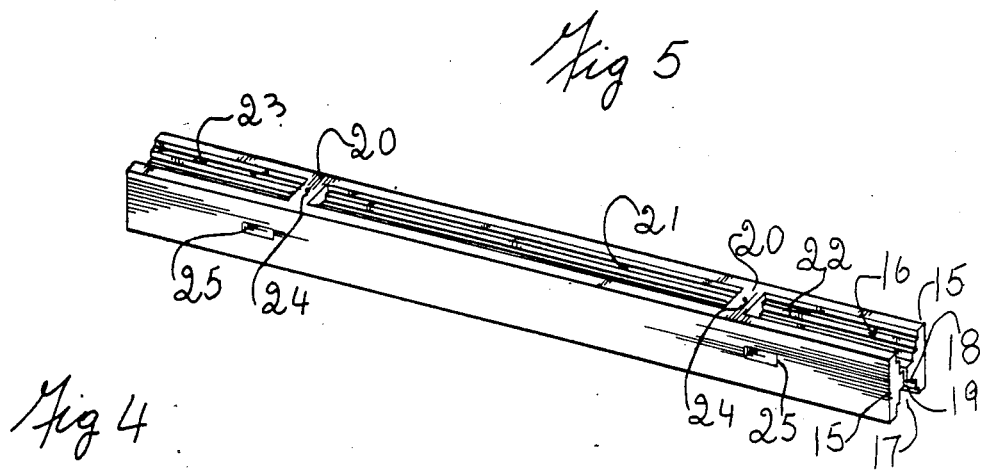
FIG. 5 is a perspective view featuring a double track in detail.

Referring now to the drawings in detail, the reference numeral 10 represents the mechanical layout of the first stage of the Hydro Lazy Tong Energy Booster system.

A base made of four base bars 11 joined together in a rectangular form, laying on four sides in an upright, horizontal position, to form a continuous edge and necessary space within the walls.

A plurality of tracks can be mounted on the base 11.

A ground of three single tracks is shown in FIG. 1: The first actuating track 12, the middle track 13, and the rimmed track 14. The tracks 12-13-14 are mounted horizontally on opposite base bars 11, parallel and spaced to clear the movements of the elements mounted within them.

A track, as shown in FIG. 5, consists of a rectangular bar having two vertical sides 15, a top channel 16, and a bottom channel 17; both channels are identically cut through the whole length of the bar, vertically superposed and divided by a center base bar 18, integral constituent of the track.

The center base bar 18 contains a plurality of drainage holes 19 provided through the whole length of it.

Two vertical anchor blocks 20, integral constituents of the tracks, divide the channels 16-17 in three sections: A middle section 21, a right lateral section 22, and a left lateral section 23.

The anchor blocks 20 are provided with holes 24 for housing the fulcrum dead shafts of the first cross sections of all lazy tong arms.

Two slots 25 are provided on the vertical side of each track; they are horizontally cut through from side to side 15 within the center base bar 18.

Figure 3:
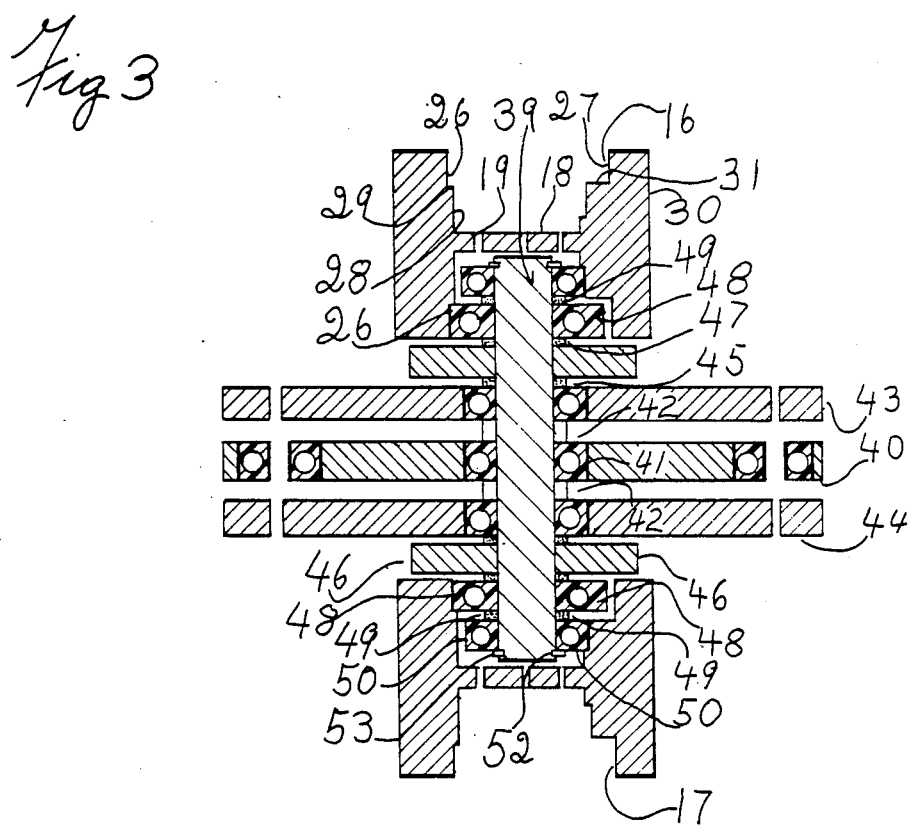
FIG. 3 is a front view of a complete system of the lazy tong arm's cross section assembled on a pivot, and mounted within the channels of two superposed double tracks.
Figure 9:
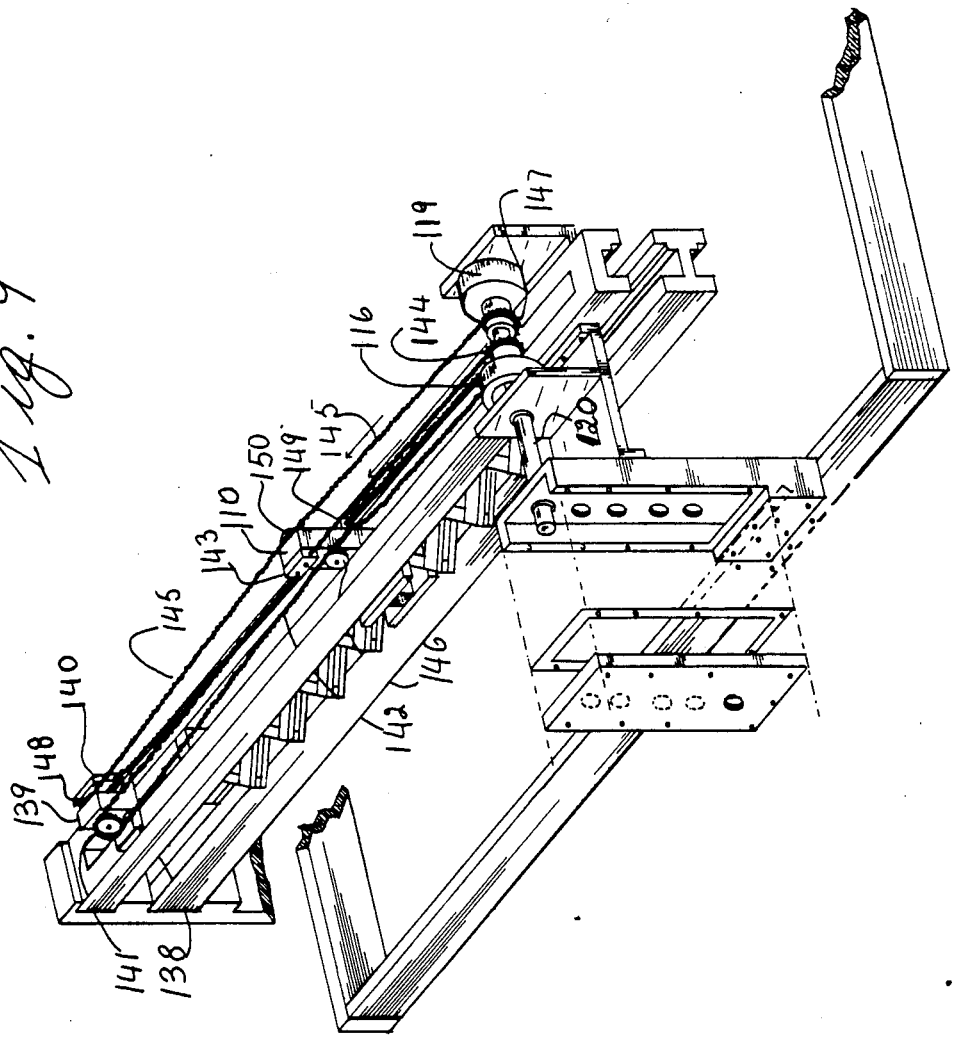
FIG. 9 is a perspective view of the silent chain system to convert the movement of the last block and plates into rotation and speed.

All channels 16-17, as shown in FIG. 3, are composed of a vertical left side wall 26 and a vertical right side wall 27, held by the horizontal center base bar 18.

The vertical left side wall 26 is highly smooth finished, and comprises a vertical left step wall 28, which provides a horizontal left bearing sit 29.

The right side wall 27 is composed of two step walls, forming a right angle bearing sit 30, a vertical highly finished right wall 27, and a clearance right angle 31.

A set of lazy tong arms is composed, as shown in FIG. 1, of two arms 32-33; each made of multiple cross sections 34, and of three or more superposed tongs 35, to minimize arching under working stress, joined together by the half tongs 36 of one end of each arm 32-33, mounted between two plates 37 divided by an integral block 38.

The three tongs 35 of a cross section 34 are mounted, as shown in FIG. 3, on a pivot 39. The middle tong 40 is mounted on the center of the pivot 39 on a bearing 41 locked on its position between two truarches 42.

The top tong 43 and the third bottom tong 44, also mounted on bearings 41, are fitted on the pivot 39 over and under truarches 42.

A spacer collar 45 is necessary over the top tong 43 and another 45 under the bottom tong 44 of every cross section, to compensate for the thickness of the plates 37, and they are mounted between washers or truarches 47.

A complete cross section, mounted between two collars 45-46 is placed between the channels 16-17 of two superposed tracks.

Two larger bearings 48 are mounted on the pivot 39; one under the bottom spacer collar 46 spaced and locked by a washer and a truarch 49, and the other over the top spacer collar 45 also locked by a washer and a truarch 49.

The larger bearings 48 will have traction on the left side wall 26 of the channels 16-17 with clearance on the right side.

Two smaller bearings 50 are mounted on the pivot 39 over the larger bearings 48 spaced and locked by a washer and a truarch 49.

The smaller bearings 50 will have traction on the right side wall 51 with clearance on the left side.

The pivot 39 protrudes over the smaller bearings 50 from both ends where its grooved 52 peripherally to hold a final truarch 53 that keeps the whole cross section assembly together.

In this manner, a cross section of lazy tongs can ride on bearings within channels and between tracks in a most stable fitness.

Therefore, many cross sections can be linked together to form an arm and many sets of lazy tong arms that can move smoothly between superposed tracks.

Figure 4:
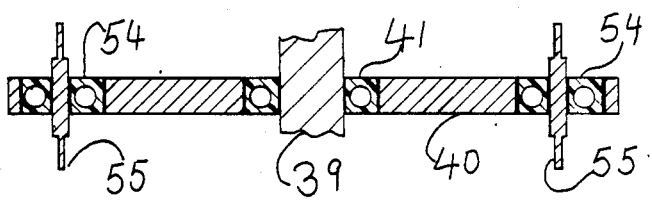
FIG. 4 is a fragmentary view of the middle tong taken from FIG. 3.

The middle tong 40, as shown in FIG. 4, features two bearings 54, each mounted laterally on each end of the tong 40.

Pivot pins 55 fastened in the lateral bearings 54 protrude over and under the bearings 54 for linking every top 43 and bottom tong 44 of every added cross section forming a lazy tong arm.

The cross section 56 (FIG. 1) of each end of a set becomes a stationary cross section 56 and the pivots 39 holding no larger bearings 48 and smaller bearings 50, are fitted in the holes 24 of the anchor blocks 20.

One set of lazy tong arms, as shown in FIG. 1, is placed on each track 12-13-14 with the larger and smaller bearings 48-50 placed in the center channels 21 and the stationary cross sections 56 mounted in the holes 24 of the anchor blocks 20.

The half tongs connected to the stationary cross sections 56 are the pulling tongs 57.

The pulling half tongs 57 of the first set of arms, placed on the actuation track 12, are mounted in slots 58 provided in the pulling blocks 59.

The pulling blocks 59, rectangular in shape, are substantially thick to fit and slide within the smooth walls of the lateral channels 22-23 of the actuation tracks 12.

The pulling blocks 59 extend vertically above the track 12 containing an horizonal slot 58 with a vertical hole perforated through top and bottom for housing the pulling pivots of the stationary cross sections 56.

The pulling blocks 59 extend also vertically downward beyond the track where they contain each a horizontal hole 66 in which the actuating cylinders 63 are fitted and bolted.

Two actuating cylinders 63 with integral mounting bases 64 are bolt mounted on a mounting bar 65 with outward thrust.

Holes 66 on the mounting base 64 allow fastening of the cylinders 63 on corresponding holes provided in the mounting bar 65 which is bolted or brazed on opposite sides of the base 11, horizontally parallel under the actuation track 12.

The basic movement of the lazy tong arms will take place when hydraulic fluid is forced in one cylinder 63.

The piston rod 62 of an actuating cylinder 63 moving forward with the pulling block 59 will exert a pull on the tongs of the first stationary cross section and as a result of it, all the cross sections forming the arm will move, extending forward, and compressing the other arm.

A valve, controlling the flow of hydraulic fluid, will always force fluid into the actuating cylinder 63 connected to a compressed arm and release the fluid from the actuating cylinder 63 connected to the extended arm, establishing a back and forth movement of the block 38 and plates 37.

Two cross bars 67 are fitted through the side slots 25 of the three tracks 12-13-14 to link them together and to provide a mounting base for the fulcrum blocks 68.

One fulcrum block 68 is mounted on each cross bar 67 adjacent the left side of the second track 13, and one on each cross bar 67 adjacent the left side of the third track 14.

The fulcrum blocks 68 are of a solid rectangular shape, having the width of the cross bars 67, the height of the adjacent tracks, and the length necessary to provide a vertical hole in which are fitted the fulcrum pivots of the levers that will be placed on them.

The tracks 12-13-14 are still secured against the fulcrum blocks 68 by a wedged, threaded, bolt placed against the right side of the track in a slot provided in the cross bars 67.

One lever 69, housing a fulcrum bearing with a pivot protruding from top and bottom, is mounted between every two fulcrum blocks 68 with the pivots fitted in the holes 70 provided in the fulcrum blocks 68.

The resistance of each lever holds a dead pin fitted in a vertical hole provided toward the end and it protrudes from top and bottom of the lever 69.

Link bars, each holding one bearing at each end, connect the pulling half tongs 57 of each arm to the resistance of the levers 69, with one bearing mounted on the protruding pins over and under the resistance of the levers 69, and with the other bearings mounted on the pivots of the half tongs 57.

Two pulling link bars 71, holding bearings at each end, link the effort arms of each lever 69 to the block 38 and plates 37 of each lazy tong arm set.

One end of each link bar 71 is mounted on top of the effort arms and the other on the bottom, with the bearings mounted on pins 73, vertically fitted in a hole provided in the effort arm of the levers 69 and protruding from top and bottom.

One end of a link bar 71 is mounted on top of the plate 37, and the other on the bottom plate 37, on pins 74 placed in the plates 37 that protrude from the outer surface of the plates 37, leaving the space between plates 37 clear for the movement of the lazy tong arms.

In this manner, the levers 69, connected to the pulling half tongs of the second set of lazy tong arms on track 13, are linked to the block 38 and plates of the fist set of lazy tong arms on track 12.

Three sets of lazy tong arms are illustrated in FIG. 1 forming the first level.

The first set of lazy tong arms is actuated by the power of two cylinders 63.

Consequently, one stroke of a piston will extend, simultaneously, all the arms on one side, closing all the arms on the opposite side while the power of the piston, transmitted to the block 38 and plates of the first set of lazy tong arms, is applied to the effort arm of the first lever with the leverage transmitted to the block 38 and plates 37 of the second set; the power of the block and plates of the second set is applied to the effort arm of the second lever, with the leverage transmitted to the block 38 and plates 37 of the third set, and so on for a number of times - each time multiplying the resulting power by the leverage.

A loss of extention may occur gradually, and gradually can be gained by extending properly the length of the half tongs 36 of the last cross section and that of the half tongs 36 connected to the block 38 and plates.

The lazy tong arm mechanism, therefore, consists of two systems linked together; one opposite the other, for one has to extend and close the other reciprocally.

A supporting bar 75, with a smooth top surface, is bolt mounted on the cross bars 67 between tracks under each two levers 69, from base to base 11, to support the weight of the levers 69 while in motion.

After three sets of lazy tong arms, three more can be conveid to a second higher level.

The block and plates of the third set of lazy tong arms on track 14 are modified.

The modified block 76 and the plates 77 are extended horizontally inward to the left, and a metal block 78 is added under the bottom plate 77 as an integral part of it that extends vertically down, adjacent the rim 79 integral of track 14, to hold bearings 80 (FIG. 2) mounted on dead shafts 81, fitted in lateral holes provided horizontally in the block 78 to have traction under the rim 79 of the third track 14.

A block integral, or added, on top of plate 77 is extended upward to hold on top of it two parallel plates 83 divided by a block 84 to reach and link the levers of the fourth set of lazy tong arms mounted on the second level.

Two lateral bearings 85 are mounted on dead shafts 86 fitted in holes provided horizontally at the bottom of the extended block 83 to have traction over the rim 87 of the superposed double track.

The modified block 76 and plates 77, mounted in the center channel of track 14, will have horizontal mount with two bearings 81 rolling under the rim 79 of the bottom single track 14, and two bearings 85 rolling over on top of the rim 87 of the superposed double track to minimize torsion.

The first level of three sets of lazy tong arms is mounted on the three single tracks 12-13-14 and three superposed double tracks with the fulcrum pivots in the holes provided in the anchor blocks 20 of the single track 12-13-14 and in corresponding holes provided in the face down anchor blocks of the superposed double tracks 88-89-90.

The second level of lazy tong arms is formed on top of the first three double tracks 88-89-90 within a second set of three superposed double tracks 91 (not shown to keep the drawing clear).

The top block 84 and plates 83 on the modified block 76 will reach the space between the first double track 88 and the second double track 91, on the right side, to engage the tenon 92 of two modified link bars 93, connected to the levers 94 of the fourth set of lazy tong arms, to convey the power of the first level to the second level.

There are only two sets of lazy tong arms on the second level and on every additional one, and they are similar in construction to those of the first level; but with opposite functional direction in every added one.

The fulcrum blocks 95-96, on the second level, are mounted on the left side of the cross bars 97 placed in the slots 25 of the double tracks 88-89-90 adjacent the right side of the fourth 89 and fifth track 90, and the levers 94 are mounted on them with the effort arm toward the right side.

The block 98 and plates 99 of the fifth set of lazy tong arms is extended horizontally to the left and linked to the effort arm of the levers 94 of the fifth set of lazy tong arms.

The block 100 and plates 101 of the fifth set of lazy tong arms is a modified block, extending horizontally to the right and vertically upright to reach and engage the levers on next level with raised parallel plates 102 divided by a block 103.

A stack of double tracks will rise over every single track 12-13-14, placed in indentations provided on the base bars, and every track is mounted in two mounting spacer bars 104 (and 105 in dotted lines) bolted on opposite base bars 11.

Each end of every track is placed and bolted in slots 106 provided in the mounting spacer bars 104-105, while the teeth 107, forming the slots 106, will space the tracks in a perfect, stable position, leaving a proper space between tracks for the movement of the lazy tong arms.

The last two tracks of the mechanism, on top of the last two sets of lazy tong arms, are single tracks; shown in FIG. 7 is the last track 108.

The middle section 109 of the last track 108 is open through top and bottom to allow fittness of a power converter block 110.

The power converter blcok 110 is a solid rectangular with four sides; integral, or mounted, on the block and plates 111 of the last set of lazy tong arms.

The power converter block 110 will fit and slide in the middle section 109 of the last track 108 and extends vertically upright above it.

The power converter block 110 will move back and forth with the block and plates 11 within the open section 109 of the last track 108.

This movement, with the final power of the mechanism, is converted to rotation and speed.

Two gear rack bars 112-113 are mounted on the power block 110: one bolt mounted on the left side 112 horizontally parallel with clearance over the track 108, and with the toothed side 114 upward to engage with a geared sleeve 115 containing an integral drum 116.

The other bar 113 is horizontally bolt mounted higher, on the right side of the power block 110 with the toothed side 117 facing down, to engage with a second geared sleeve 118 containing an integral drum 119.

Both sleeves 115-118, containing integral drums, are mounted on the same shaft 120, sleeve to sleeve, divided by a spacer collar 121 integral, or fitted, on the shaft 120.

Three bearings are fitted on the shaft 120: one bearing 122 on each end, and an intermediate one 123 to allow mounting of the shaft 120 on three mounting plates.

The shaft 120 is, therefore, mounted with a lateral bearing fitted in a hole provided in the right side plate mount 124 which extends vertically down and horizontally to the left and vertically down in a double reverse angle to allow mounting of the plate mount 124 on the right side of the single track.

The intermediate bearing 123 of the shaft 120 is fitted in a hole provided in the intermediate upright plate mount 125 which extends at the bottom, horizontally to the right, and to the left in a double L-shape with reverse vertical angle mount to allow right side mounting on the left side of the last single track 126 and left side mounting on the side wall 127 of the gear box 128.

The left side bearing 122 is fitted in a hole provided in the side wall of the gear box 128 from where the shaft 120 protrudes within the box 128 with the necessary length; to have a gear mounted on.

The gear rack bars 112-113 are grooved 129 horizontally, each on two sides to fit on tongs provided in the slots 130 of the plate 131 (FIG. 8, and in the dotted lines 130), mounted vertically on the front edge of the right side mounting plate 124 and the front edge of the intermediate mounting plate 125.

The gear rack bars 112-113 will slide in the slots 130 driven by the power converter block 110, and held in a steady position by the tongs with contact on the toothed sleeves 115-118 and with clearance between teeth and slots to avoid damage to the toothed sides of the bars 112-113.

The geared sleeves 115-118 will rotate on the shaft 120, clockwise and counter-clockwise, driven by the gear rack bars 112-113 while the drums 116, provided with radial pawls, engage and drive a rocket wheel fastened on the shaft 120, only in one direction, for the top right side gear rack bar 113, mounted over the right side toothed sleeve 118, exerts a clockwise rotation, moving forward to the right, and the left side gear rack bar 112 mounted under the left side toothed sleeve 115 will exert a similar clockwise rotation, moving backward to the left.

Therefore, booth drums will engage the shaft in a continuous one-way rotation using the forward movement of the last two lazy tong arms.

A cast gear box 128, bolt connected to the intermediate mount 125, comprises three side walls: two lateral and a back side wall, which extends from above the power shaft 120, vertically down, with an open front side, for the necessary length to allow mounting of a gear train system in it, and to extend further down as a four wall receptacle for retain transmission lubricant.

A succession of horizontal sockets 132 back reinforced, are properly placed in the back side wall 127.

A cover plate 133 with perpheral holes 134 is bolt mounted over a gasket 135 in corresponding holes 136 drilled and threaded on the edges of the lateral walls to enclose a gear train system and to allow mounting of the gear train shafts in the sockets 132 of the back side wall 127 and in corresponding sockets provided in the front cover plate 133.

The shaft 137 of the last gear will protrude from the last bottom hole perforated through the front cover plate 133 to provide power and speed.

The system to convert the back and forth movement of the power converter block 110 into rotation can also be accomplished by replacing the radial teeth of the sleeves with one or more sprocket wheels on each sleeve.

The sprockets wheels, having radial grooves within the center holes, are mounted on the sleeves, fitting on corresponding teeth provided on them; truarch lock them in a steady position.

A sprocket wheel mount 138 comprising a base with an integral upright, middle block 139 and two integral side blocks 140, each perforated to hold a dead shaft in the communicating holes, on which two free sprocket wheels 141 are mounted over bearings, is bolt mounted on one far end of the single track 108 through vertical holes provided on the base mount 138 over the space between the middle block 139 and lateral blocks 140.

A silent chain 142, joined in a loop by the links of both ends fitted in a link shaped block 143, is bolt mounted high on the left side of the power converter block 110 with bolts provided in the link block 143 that intercept the holes of the links and screw in threaded holes provided in the power converter block 110.

The loop of chains 142 is mounted over the left sleeve sprocket 144 and around the left free sprocket wheel 141.

The length of the top chain is placed on a supporting sprocket free wheel 146 mounted on the left side of the power converter block 110 under the link block 143.

Another loop of silent chain 145 is placed on the right side sleeve sprocket wheel 147 and around the right side free sprocket wheel 148 with the link block 149 bolt mounted, in the same way of the left side chain, low on the right side of the power converter block 110.

The top length of it is placed high on a supporting free sprocket wheel 150 mounted over the link block 149.

The left side loop of chains exert a direct right to left pull from the top link block 143 turning the left sprocket wheel 144 counter clock-wise on the right to left movement of the power converter block 110.

The right side link block 149 exert an indirect left to right pull from under the free sprocket wheel 148 and right to left from over the supporting free sprocket wheel 148 on the left to right movement of the power block 110 turning the right sprocket wheel counter clock-wise.

In this manner, the drums 116-119 engage the shaft 120 on a counter clock continuous rotation, or clockwise rotation by inverting the pull on the sprocket wheels mounted on the sleeves with drums.

The system of the levers pulling directly on the half tongs of the lazy tong arms can be modified to have the thrust of the levers applied on pistons to force hydraulic fluid out of the cylinders.

Two cylinders are required for the basic movement of the system: a stationary cylinder and a moveable cylinder.

The stationary cylinders 151, bolt mounted on the mounting spacer bars 104-105 with the piston rods 154 fitted through the perforated teeth (FIG. 6) are connected to the half tongs of the lazy tong arms with slotted blocks 153, mounted on the piston rods 154.

The moveable cylinders 155 are mounted with perforated integral mounts 156 on pivots to follow the movement of the lever's resistance.

The piston rods 157 of the moveable cylinders 155 are connected to the resistance of the levers 158 with slotted blocks 159 mounted on them.

The thrust of the levers 158 will force the pistons 160 down and the hydraulic fluid out of the moveable cylinders to enter the stationary cylinders 151 through flexable hoses 161 from the top, forcing the pistons 162 down to exert a pull on all arms of the mechanical system.

Yet another system is possible to apply the thrust of the resistance of the levers on the half tongs.

The pulling half-tongs 163 (FIG. 11) of all lazy tong arms are placed between two plates 164 on a middle block 165.

The plates 164, mounted or integral of a cast block, are mounted on two pivots over bearings, similar to the assembly of the cross sections (FIG. 3) to ride in the lateral channels of the tracks.

The middle blocks 165 extended horizontally to the left toward the levers with fixed dead pivots 166 and bearings, are linked to the resistance 167 of the levers with link bars 168 mounted on the middle block pivots 166 and the pivot 169 set on the resistance 167 of the levers.

The forward thrust of the resistance 167 exert a push on the middle block 165 and a pull on the half tongs 164 to extend the lazy tong arms.

Figure 12:
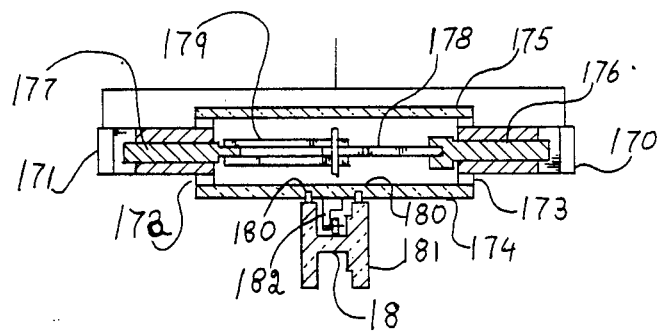
FIG. 12 is a schematic view of a modified system to apply the thrust of the levers on the half tongs of the lazy tong arms; herewith, the power of the moveable cylinder is applied on caliper cylinders to close the half tongs of the first anchored cross section for extending the lazy tong arms.

The thrust of the levers can still be applied on the half tongs in a different way (FIG. 12).

Hydraulic fluid expelled from the moveable cylinder (FIG. 10) actuate two caliper cylinders 170-171 mounted with the front integral mounts 172-173 between two plates 174-175.

The piston rods 176-177 are connected to the half tongs 178-179 of the first cross sections 56.

A slotted block, mounted on one piston rod 176, is connected to the single half tong 178, the other piston rod 177 is connected between the two half tongs 179.

The piston rods 176-177 of the caliper cylinders 170-171, receiving fluid from the moveable cylinder (FIG. 10), exert pressure on the half tongs 178-179 of the first cross section, closing them to extend the lazy tong arms.

The plates 174-175 will move with the half tongs 178-179 sliding on top of a track and the bottom of another supported by replaceable pads 180 fitted in holes provided in both plates 174-175 and by a bearing 181 mounted on each plate with a bracket 182, to roll on the track center base bar 18.

Figure 13:
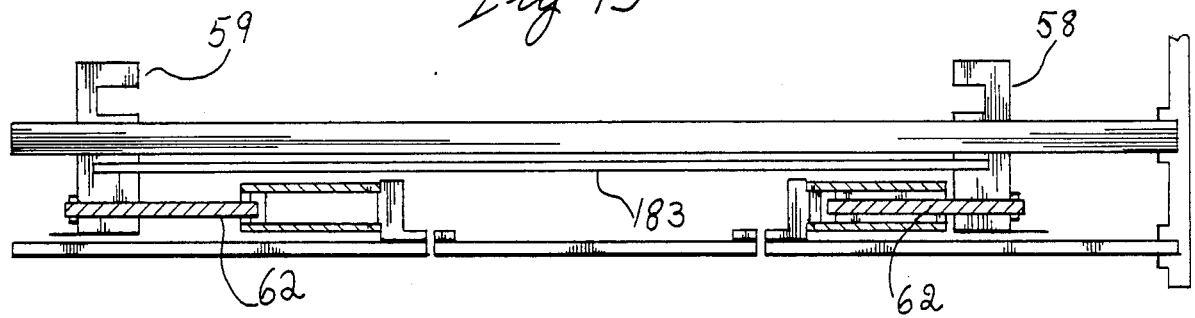
FIG. 13 is a fragmentary schematic view of the actuating cylinders taken from FIG. 1.

The pulling blocks 59 (FIG. 13), bolt mounted on the piston rods 62, are linked by a bar 183 bolt mounted on each side of the pulling blocks 59 or by an adjusting rod threaded at both ends and fitted in threaded holes provided horizontally on the pulling blocks 59.

Figure 14:
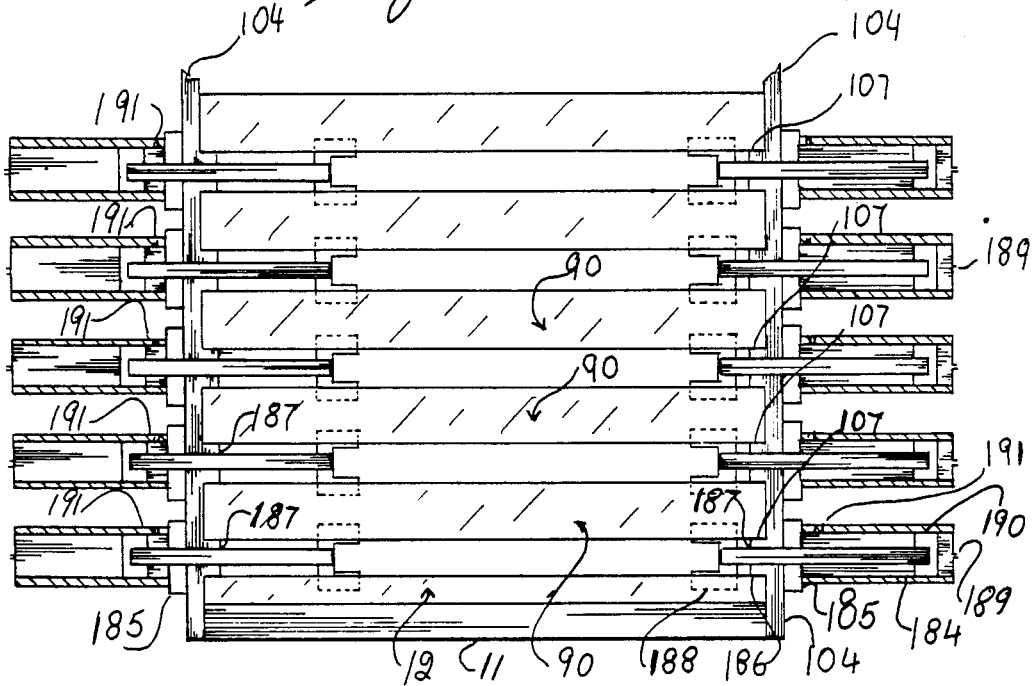
FIG. 14 is a schematic view of a modified actuating system; herewith, the cylinders of the first system are replaced with two cylinders mounted on opposite mounting spacer bars; included is also the system of the stationary cylinders.

The actuation of the first set of lazy tong arms is also possible by direct, horizontal, inward thrust of two cylinders (FIG. 14).

Two actuation cylinders 184 comprising an integral front base mount 185 are bolted, each on the outer side of a mounted spacer bar 104-105, between the first single track 12 and the superposed double track 90, opposite each other with inward thrust.

The piston rods 186 are placed through holes 187 contained in the teeth 107 of the mounting spacer bars 104-105.

Slotted blocks 188 (dotted lines) are screw mounted on the rods 186 and are connected to the half tongs of the first set of lazy tong arms.

The cylinders 184 are provided with air breeders 189 at the bottom to let the pistons 190 move inward when hydraulic fluid from the moveable cylinders 155 (FIG. 10) enters the cylinders 184 through the front feeders 191 to exert a pull on the half tongs for extending one arm and closing the other.

All the stationary cylinders 151 (FIG. 10) that follow the actuation cylinders 184 are mounted likewise on the outer side of the mounting spacer bars 104-105.

Figure 15:
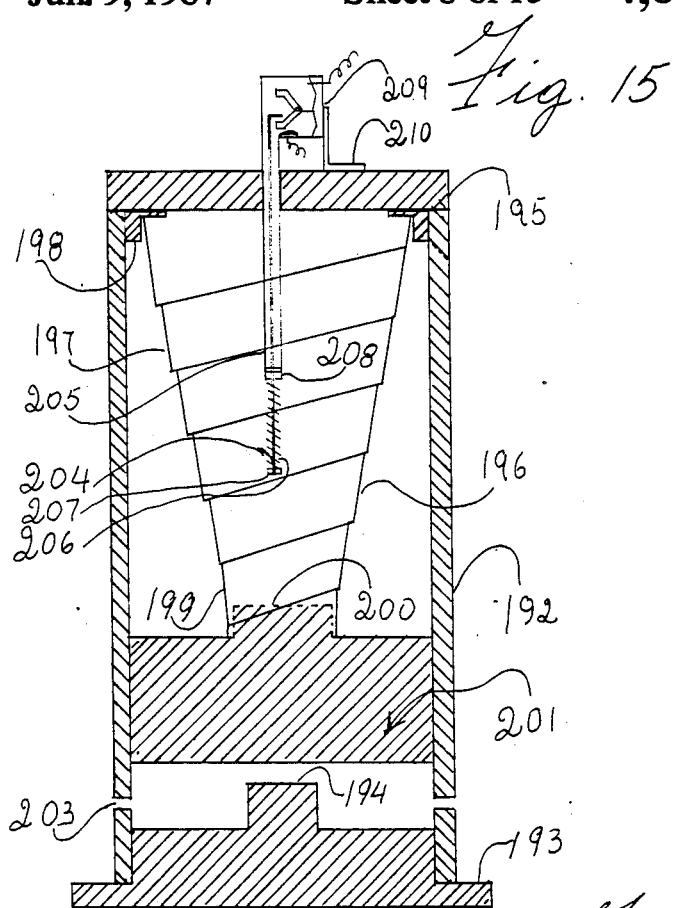
FIG. 15 is a schematic front view of an accumulator with an inner conical leaf spring.

A low revolution eccentric pump is necessary to force hydraulic fluid into an accumulator, where it is kept under pressure to be used without need of the pump till most of the consumption of it (FIG. 15).

The accumulator consists of a sturdy cylinder 192 with a screw bottom base 193 provided with a stump 194 like protrusion on the center top, within the chamber and an integral top 195.

A conical compression leaf spring 196 is placed within the cylinder 192 with the wider coil 197 against the top, contained by a rimmed plate 198, and the smaller coil 199 fitted over the center stump 200 like protrusion integral constituent of the piston 201.

Two peripheral diametrical holes 202-203 are provided on the cylinder walls: one to contain a one-way valve fitting to intake and hold pressure within the cylinder 192, the other to contain an outlet fitting leading to a dual control valve for controlling the flow of fluid to and from the actuation cylinders 63.

The stump 194 on the screw bottom 193 prevents the piston 201 from blocking the peripheral holes 202-203 and it could be replaced by a stump on the piston or by the piston rod of the modified accumulator.

The fluid entering the cylinder 192 will rise the piston 201 to the maximum desired compression of the spring 196 gradually lifting a rod 204 contained within a sleeve 206 and held down by a spring 206 against a retainer 207 at the end of the rod 204 and the rim 208 of the sleeve 205.

The rod 204 will move up and down with the piston 201 to actuate an electric switch 209 mounted with a bracket 210 on top of the cylinder 192.

The electric switch will actuate a solenoid valve connected to the accumulator's intake line to deviate the flow of fluid into the fluid reservoir when the accumulator is full and back into the accumulator where the pressurized fluid from the accumulator is mostly used.

Figure 16:
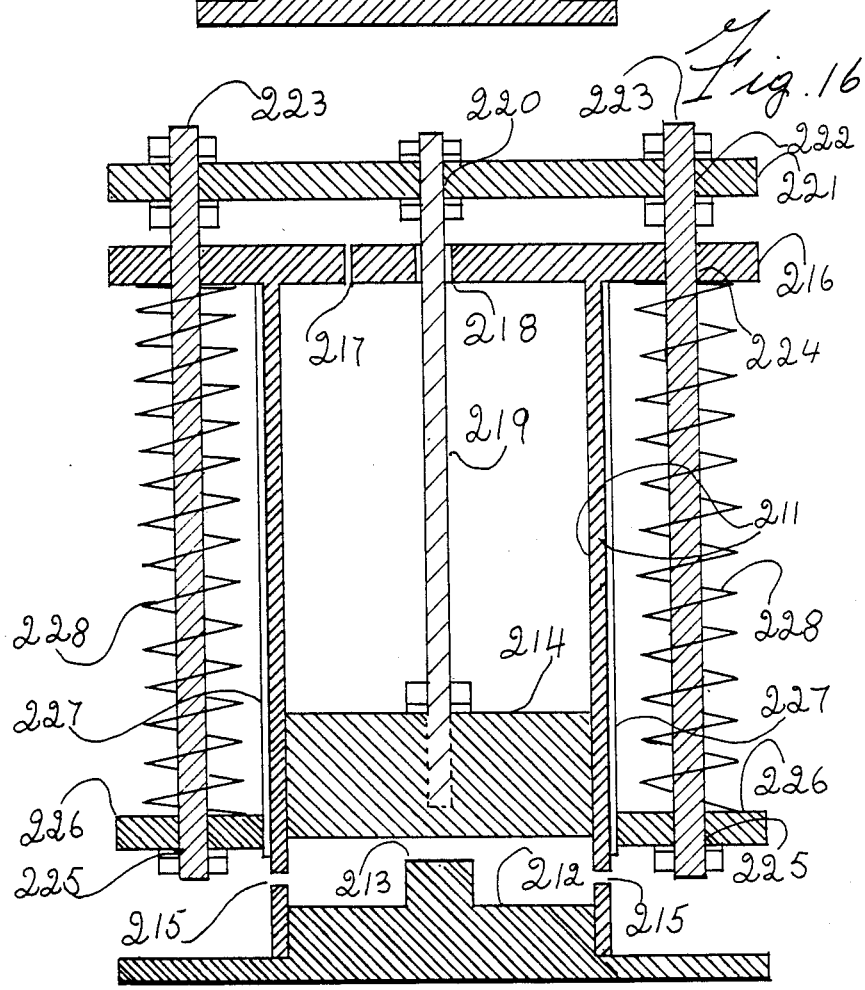
FIG. 16 is a schematic front view of a modified accumulator; herewith, the inner spring is replaced with compressing coil springs mounted outside, around, the cylinder.

FIG. 16 represents a modified accumulator, it consists of a sturdy cylinder 211 with a screw bottom base 212 having on the center a stump 213 like protrusion to prevent the piston 214 from blocking the peripheral holes 215.

The cylinder 211 contains a flanged integral top 216 substantially wider than the cylinder 211, with a breather hole 217 and a center perforation 218 with a bushing.

A rod 219, screwed and bolt mounted on top of the piston 214, protrudes through the center hole 218 of the flanged top 216 to reach and be connected in the center hole 220 of a circular pulling plate 221.

Radial holes 222, provided in the circular pulling plate 221, allow bolt fastening of rods 223 that extend vertically downward, passing through holes 224 provided radially in the flanged top 216 to reach and be bolt fastened within holes 225 of a sliding ring plate 226 placed on the cylinder 211 to slide over vertical bronze bars 227 peripherally on the cylinder.

A compressing coil spring 228 is placed on every rod 223 resting under the flanged top 216 and on the sliding ring plate 226.

Hydraulic fluid, entering the cylinder 211 through one of the peripheral holes 215, will rise the piston 214 exerting an equal upward thrust to the pulling circular plate 221 and to the connected sliding ring plate 226.

The coil springs 228 will be compressed to apply a downward thrust on the piston 214 when the cylinder 211 is full and the eccentric pump cease to supply.

Figure 17:
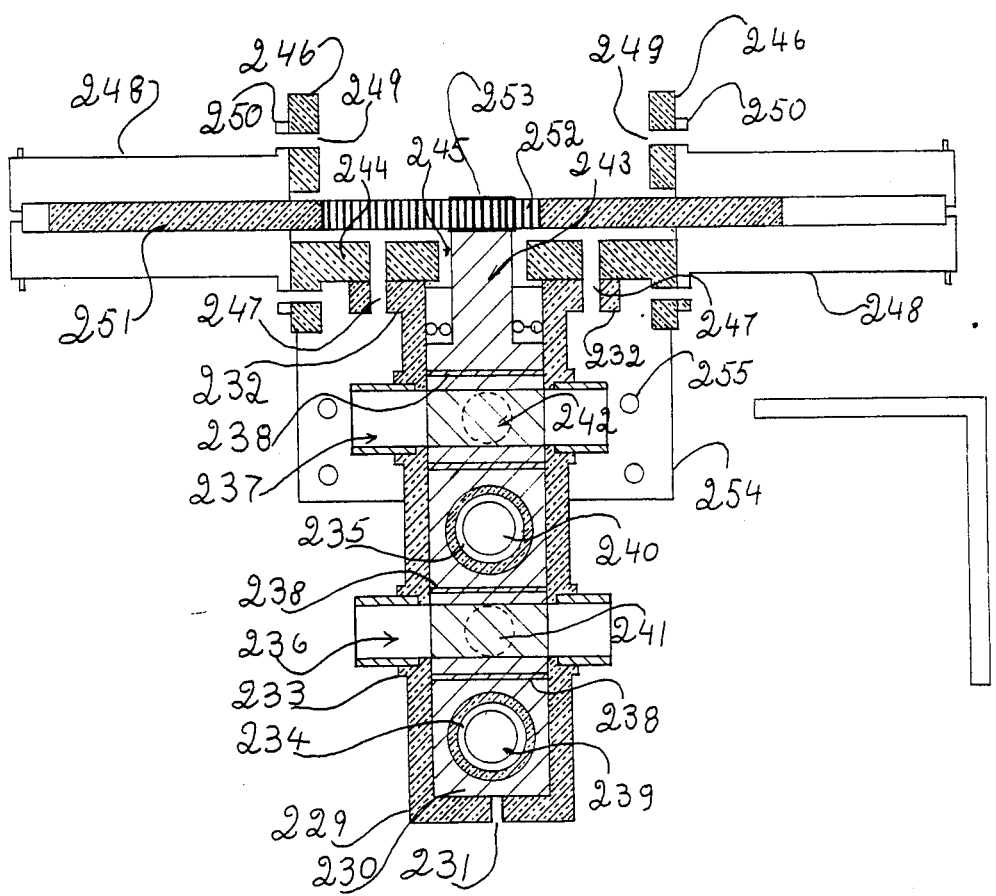
FIG. 17 is a schematic view of a four way hydraulic valve actuated by two solenoids and a rod with a middle section gear rack.

FIG. 17 represents a four-way hydraulic valve consisting of a cylinder 229 and a moveable rod 230 within the chamber.

The cylinder 229 incorporates a bottom with an air breather 231 or a screw bottom and an open top with a flanged rim 232.

Four orifices with reinforced necks 233 are contained on the cylinder wall, each corresponding diametrically to an opposite hole.

The first orifice 234 at the bottom of the cylinder and the third 235 are placed vertically on the same line, spaced by the second 236 and fourth 237, placed transversely on the opposite vertical line.

The moveable rod 230 contains four holes drilled diametrically through, interspaced by pressure rings 238 fitted on the rod 230 in peripheral grooves, and superposed vertically on the same line as a sequence corresponding to the same position of the orifices 234-234-236-237, so that the first hole 239 at the bottom of the rod 230 and the third hole 240 will communicate with the corresponding orifices of the cylinder on one position of the rod 230, while the second 241 and fourth 242 are blocked by the inner wall of the cylinder 229.

On a changed position of the rod 230, one-fourth turn to the left or to the right, the second hole 241 and the fourth 242 communicate with the corresponding orifice of the cylinder 229, while the first 239 and third 240 are blocked by the inner wall of the cylinder 229.

The first orifice 234 from the bottom and the second 236 are connected to the feeding line from the accumulator (FIGS. 15-16).

The third 235 and the fourth 237 orifices are the outlet orifices and they are connected to the line returning hydraulic fluid to the reservoir.

Therefore, the first orifice 234 will supply hydraulic fluid to the first actuating cylinder 63 (FIG. 17) while the third 235 will release the fluid from the second actuating cylinder at one position of the rod 230.

On the second position of the rod 230, the second orifice 235 will supply hydraulic fluid to the second actuating cylinder 63 (FIG. 17) while the fourth 237 will release the fluid from the first actuating cylinder 63 (FIG. 17) while the fourth 237 will releae the fluid from the first actuating cylinder.

The rod 230 is longer than the cylinder 211 and the extended section above the last hole 242 and rings 238 is reduced in thickness to form a neck 243.

A bronze collar with an outer thread is placed on the neck 243 and will screw on the inner threaded cylinder applying light pressure on a washer and rings to hold the rod 230 in the cylinder 211.

A square plate 244 with a center hole 245 and two side brackets 246 extending vertically upward and downward is fitted over the neck 243 of the rod 230 and is bolt mounted on the flanged rim 232 through peripheral holes 247 corresponding to the threaded holes on the flanged rim 232.

One solenoid 248 is fastened on each bracket 246 with bolts through peripheral holes 249 provided on the flanged rim 250 of the solenoid's shell and corresponding to threaded holes 249 contained in the brackets 246.

A rod 251 with a middle section gear rack 252 is placed in the solenoids 248 engaged with a wheel gear 253 fitted on the neck 243 of the cylinder rod 230.

The gear rack 250, actuated by the double action of the solenoids 248, will turn the rod gear 253 changing the position of the rod 230 in the cylinder for the four-way function of the valve.

A mounting plate 254, with holes 255, is fastened on one side of the plate 244 and brackets 246 to place the four-way valve on any convenient place; for the train gear of the lazy tong mechanical system will be in full speed at the first stroke of one actuating piston 63 to have a generator supply current for the function of the solenoids through a switch actuated by the actuating piston pulling block 59.

Figure 18:
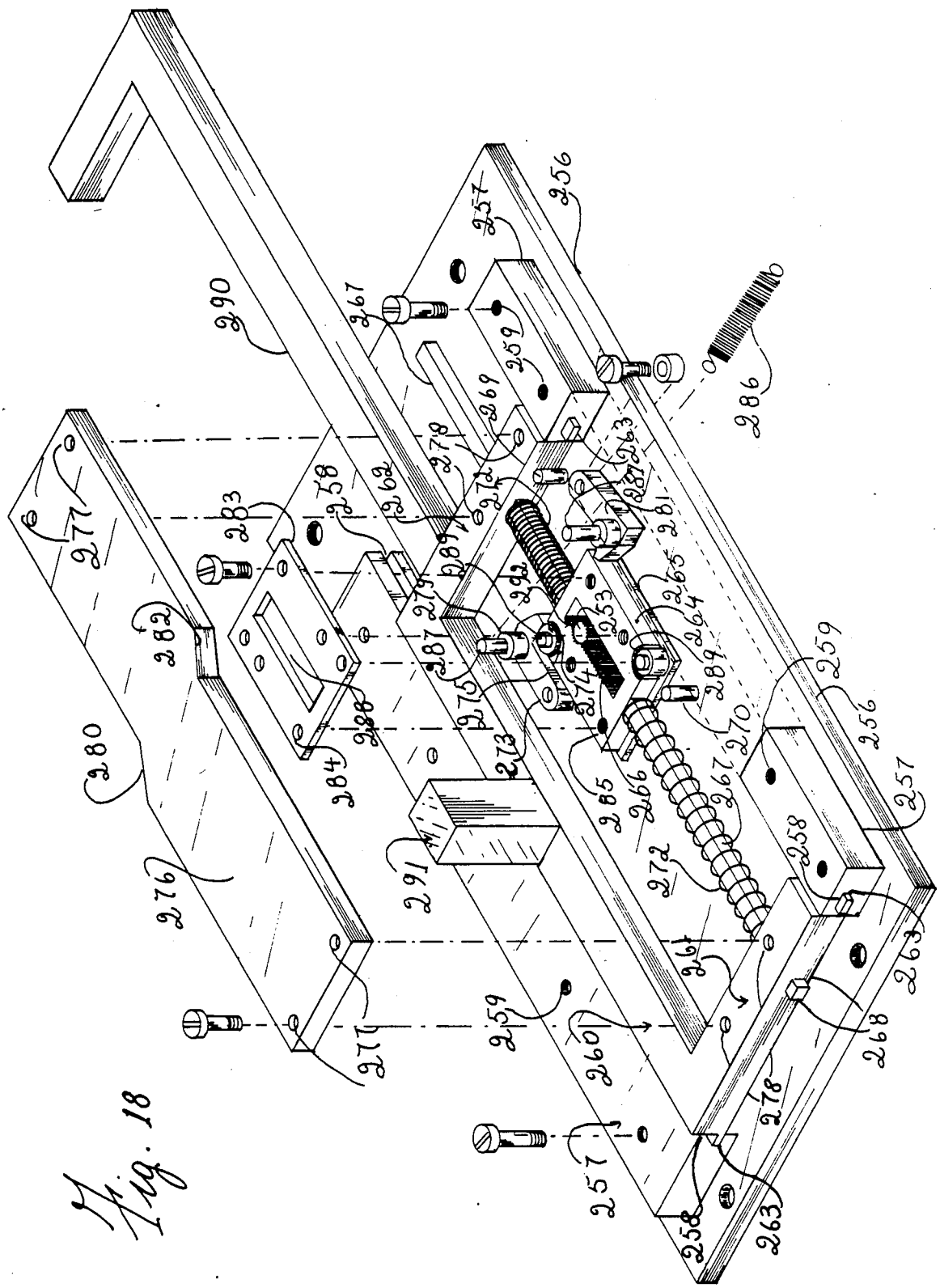
FIG. 18 is a perspective view of a mechanical devise capable of actuating the hydraulic valve without the solenoids.

FIG. 18 represents a mechanical actuator which can replace the solenoids or that can be combined as a mechanical and electric unit for the actuation of the four-way hydraulic valve.

It consists of a rectangular plate 256 of considerable thickness to allow mounting of the actuator's components on its surface:

Two parallel bars 257, each with a groove 258 on one side through the whole length of it, are parallel mounted with screws on opposite sides of the plate 256 through holes 259 provided on them and in corresponding threaded holes on the plate 256, and with the grooves 258 toward each other.

A top bar 260 with an integral left arm 261 and a right arm 262 forming a bridge is mounted with integral projecting tenons 263 in the grooves 258 of the parallel bars 257, allowing the bridge a smooth sliding motion.

A sliding block 264, with a peripheral bottom rim 265 and an open slot 266 about the linear center of it, is placed on the plate 256 held in its position by two rods 267 each mounted on opposite sides of the sliding block 264 and fitted in slots 268 or holes provided in the arms 261-262 of the bridge; thus, the sliding block 264 can be made to slide back and forth on the plate 256 with the rods 267 sliding in the arms 261-262 of the bridge.

Figure 19:
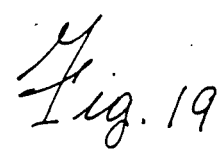
FIG. 19 is a schematic view of the stop bars, replacing the pegs, that could be integral of the plate of the mechanical actuator.

The movement of the sliding block 264 is controlled by two sturdy pegs: a front peg 269 screwed on the plate 256 in front of the block 264 and a back peg 270 screwed behind the block 264; or by two stop bars 271 (FIG. 19) integral of the plate 256, or screwed on the plate 256.

A compressing coil spring 272 is placed on each rod 267 resting against the sliding block 264 and the arms 261-262 of the bridge.

When the bridge is forced to the right, the left arm 261 will compress the left side spring 272 against the sliding block 264 which is held by the nose of a latch 273, mounted on the left of the sliding block 264, grasping at the roller 274 mounted on the top right corner of the sliding block 264 backed by needle rollers 275.

During the compressing action, the right arm 262 will move away to the right, decompressing the right side spring 272.

As the left side spring 272 is about full compressed, a double cam plate 276, screwed on the arms 261-262 of the bridge through holes 277 provided in the double cam plate 276 and in threaded holes 278 provided in the arms 261-262 of the bridge, disengages the left side latch 273 from the roller 274 with the left side cam 280 exerting outward pressure on the latch roller 279 mounted on the left side latch 273.

The sliding block 264 will now move to the right against the stop peg 269 and is held in this position by the bottom latch 281 grasping on the bottom left coner roller, backed by the needle rollers 275.

On the right to left movement of the bridge, the now compressed right spring 272 will become compressed, while the left arm 260 moves away from the left spring 272 releasing the tension till the the right side cam 282 will disengage the right side latch 281.

A top cover plate 283, equal to the size of the rimmed bottom 265 of the sliding block 264, is screw mounted on the sliding block 264 through holes 284 provided in the top cover plate 283 and in threaded holes 285 provided in the sliding block 264.

The top cover plate 283 in combination with the bottom rim 265 will form a channel in which the noses of the latches 273 will slide, held by an expanding coil spring 286 mounted over pin 287 on top of the latches 273, 281.

The top cover plate 283 comprises also a slot 288 corresponding to the slot 266 of the sliding block 264, and holes 284 to fit over the roller's pins 289.

The bridge of the mechanical actuator is provided either with an L-shaped connecting arm 290, integral of one arm of the bridge 261-262, or with a connecting block 291 placed upright on the bar 260 of the bridge.

The hydraulic valve is screw mounted under the plate 256 with the neck gear 253 fitted in the slot 266 and engaged with a gear rack 292 integral of one side of the slot 266.

Figure 20:
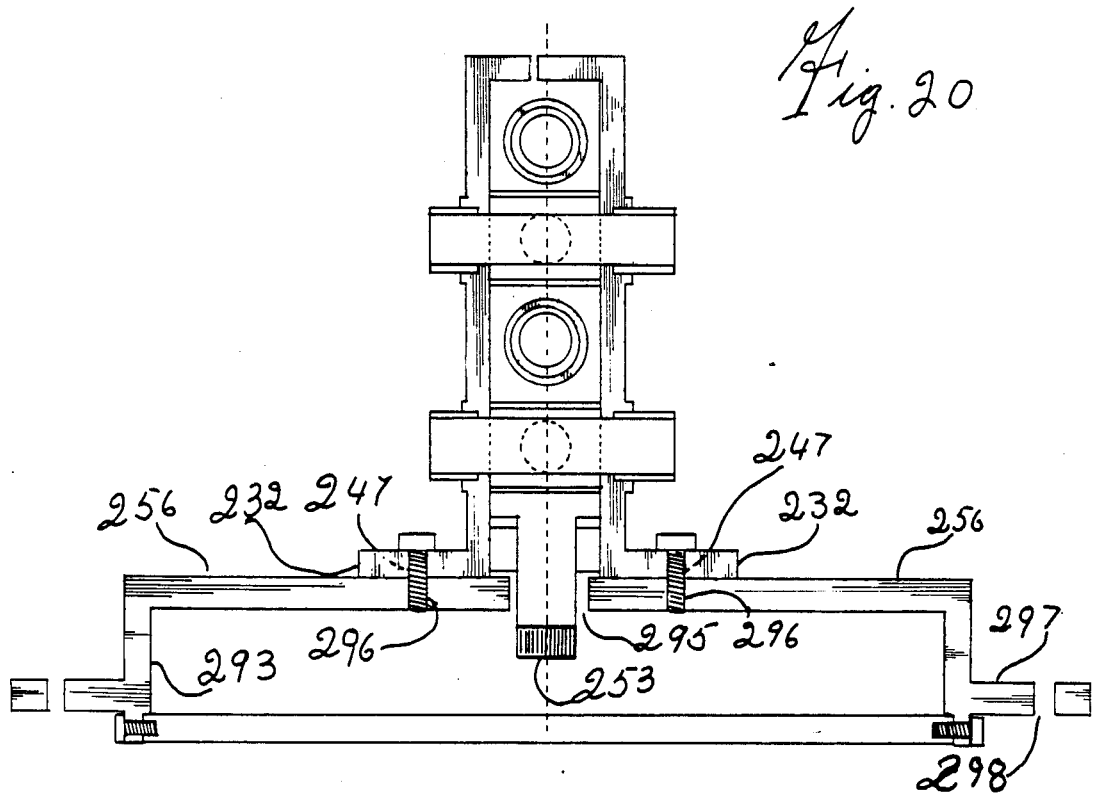
FIG. 20 is a front view of the mechanical actuator's extended plate mount with peripheral walls and cover, connected with the four-way hydraulic valve.

The plate 256 of the mechanical actuator, (FIG. 20) comprises: peripheral, vertical walls 293 with a top cover 294 to enclose the mechanical actuator; a passage hole 295 for fitting through the neck gear 253 and threaded holes 296 corresponding to the holes 247 of the valve's flanged rim 232 for screw mounting the hydraulic valve on the plate 256.

The walls 293 of the mechanical actuator's enclosure are provided wtih a peripheral rim flange 297 integral of the walls 293 and peripheral flange holes 298 for screw mounting the mechanical actuator on threaded holes, drilled on one side of the first single track, and on the first superposed double track.

Figure 21:
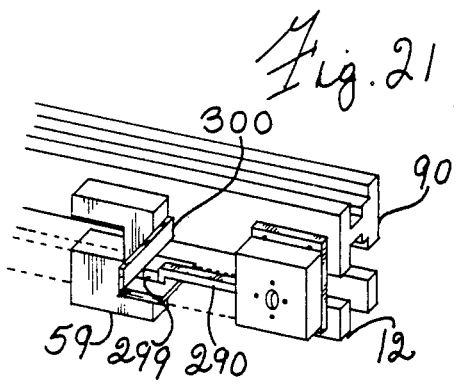
FIG. 21 is a perspective view of the mechanical actuator mounted on the first single tracks and a superposed double track with the L' shaped arm engaged with a slotted bracket mounted on the pulling block.

The mechanical actuator will function by the motion of the first pulling block 59 (FIG. 21): the L-shaped connecting arm 290 of the mechanical actuator, mounted on the first single track 12 and the first superposed double track 90, is engaged in a slot 299 of a bracket 300 screw mounted on the first pulling block 59.

Figure 22:
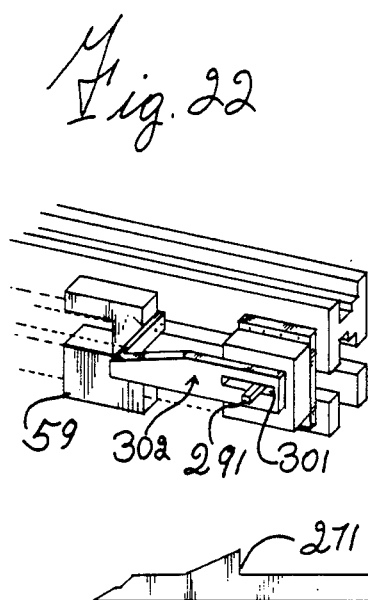
FIG. 22 is a perspective view showing the mechanical actuator mounted on the first single track and a superposed double track with the connecting block engaged with a slotted arm mounted on the pulling block.

In FIG. 22, the connecting block 291 is engaged in a slot 301 of a bracket arm 302 screw mounted on the first pulling block 59.

The slots 299, 301 of either system are to be long enough to move with the pulling block 59 but to engage the L-shaped connecting arm 290 or the connecting block 291 for only the necessary length to actuate the mechanism of the mechanical actuator.

In this manner, the back and forth movement of the first pulling block 59 will give the synchronized action for the function of the mechanism.

The gear rack 292 will turn the neck gear 253 clockwise and counter clock-wise to give the moveable rod 230 of the hydraulic valve (FIG. 17) the two positions for the function of the valve.

Figure 23:
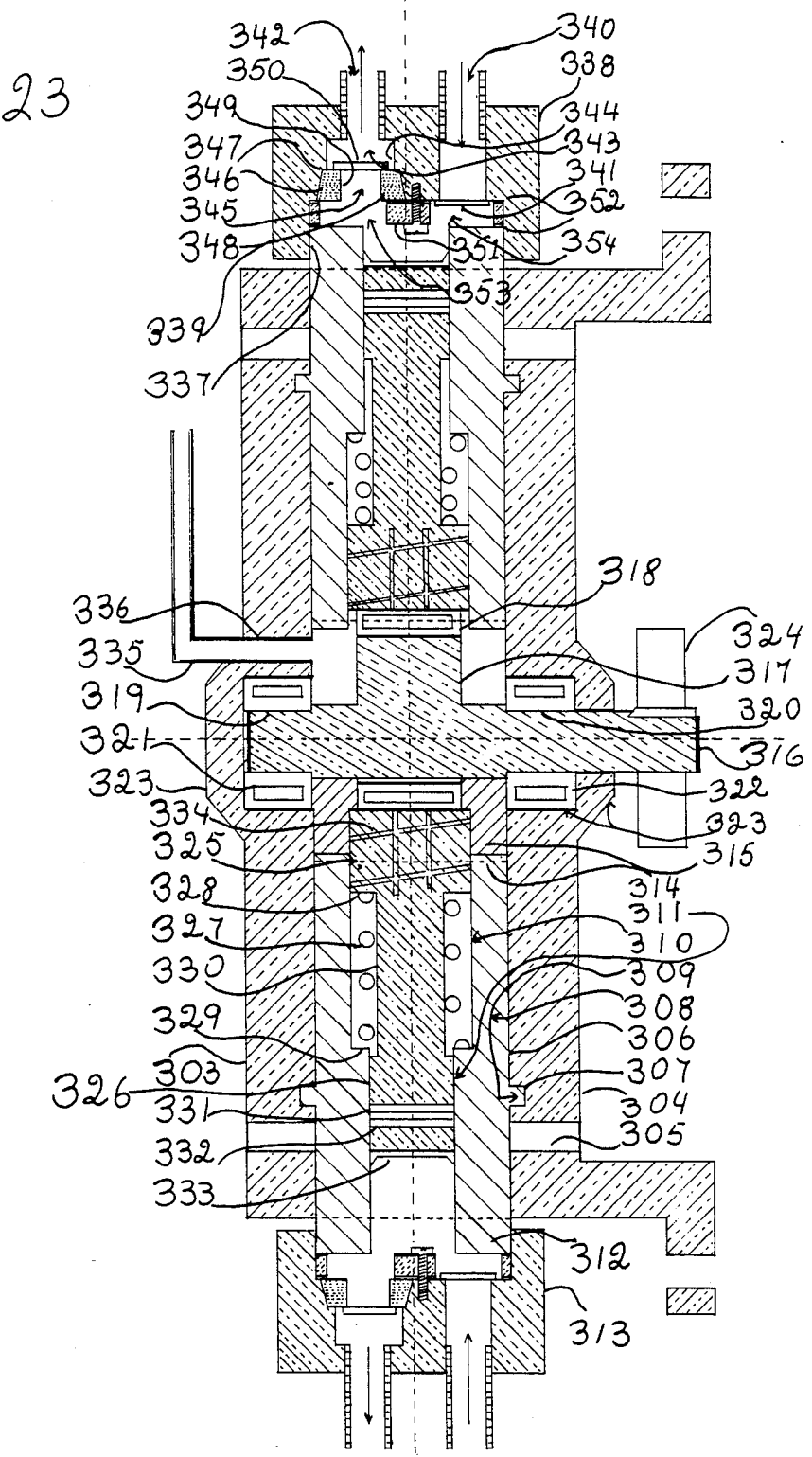
FIG. 23 is a schematic side view of an eccentric hydraulic pump shown as a body of two shields enclosing removeable cylinders of two dimensions, fitted with pistons of two dimensions holding springs, and driven by a cam shaft.

FIG. 23 is a schematic view of an eccentric pump with multiple radial cylinders and pistons of two dimentions.

The intake of the pump depends upon compressing coil springs and the output upon the action of a cam shaft.

The body of the pump is composed of two circular sheilds: a left sheild 303 and a right sheild 304 held together by bolts fitted in communicating holes 305 provided radially in both sheilds 303-304.

Each sheild 303-304 contains, radially, multiple semi-cylindrical sockets 306, each provided with a semi-circular groove 307 to form, when the sheilds 303-304 are held together, a body with radial cylindrical sockets 306 and a continuous groove 307 in each socket 306.

A replaceable cylindrical jacket 308 with an outer peripheral flange 309 and an inner two dimentional cylinder with a larger cylinder section 310 and a smaller cylinder section 311 is placed in every socket 306 with the flange 309 fitted in the groove 307 enclosed by the sheilds 303-304.

Every cylindrical jacket 308 protrudes over the body of the pump and every protrusion 312 is threaded to have a valve system block 313 screwed on it.

Each jacket 308 extends downward, but off the center, to form in combination with the inner walls of the sheilds 314 (dotted lines) a center chamber 315 large enough to allow mounting and rotation of the cam shaft.

A shaft 316 with an integral eccentric cam 317 and a roller bearing 318 on the cam 317 is placed in the center chamber 315 with both ends 319-320 redused sightly for controlled fit in a left side bearing 321 and a right side bearing 322 mounted in reinforced sockets 323 provided in the center of the sheilds 303-304.

One end of the cam shaft 316 extends through the right side bearing 322 and through the open reinforced socket 323, on the right side sheild, to have a driving gear 324 mounted and locked on it.

A two dimentional piston is placed in each cylinder with the bottom of the larger piston 325 resting on the eccentric bearing 318 and fitted in the larger cylinder 310; and with the smaller piston 326 fitted in the smaller cylinder 311.

A compressing coil spring 327 is placed on every smaller piston 326 resting on the overlap 328 of the larger piston 325 and the bottom rim 329 of the smaller cylinder 326.

Therefore, a turning cam shaft 316 will move the pistons 325-326 upward compressing the coil springs 327, while the energy of the coil springs 327 will force the pistons 325-326 down to follow the movement of the eccentric bearing 318.

Since the coil springs 327 could damage the smaller pistons 326, the section 330 of it, exposed in the larger cylinders 310 within the coil springs 327 are redused to hold the springs 327 off the wall of the larger cylinder 310 to prevent yet damage to the larger cylinders 311 and to minimize friction.

The first coil of all springs resting under the bottom rim 329 of the smaller cylinder is larger to rest under the rim 329 to clear the movement of the redused smaller piston 326.

The intake of the pump depends on the energy of the coil springs 327 and the output on the power given to the cam shaft 316.

The larger piston 325 will work as a guide to minimize deflection and as a spring retainer to establish the downward movement of the pistons 325-326.

The smaller pistons 326 contain peripheral grooves 331 fitted with pressure rings 332 and rubber cups 333 are provided on top of the smaller pistons 326.

The larger pistons 325 are provided with spiral or vertical grooves 334 or a combination of both to carry lubricant packed in the larger cylinder 310 and in the center chamber 315.

The center chamber communicates with an outside tub 335 screwed in a threaded hole 336 placed in the left sheild 303 above the left bearing 321 to breathe air or lubricant by the action of the larger pistons 325 within the center chamber 315.

The valve system block 313 is a cylindrical cast with outer facets and with a hallow threaded cylindrical cavity 337 at the bottom to screw on the threaded protrusion 312 of every jacket 308.

The top of the valve block 313 contains two sections: the intake section on the right side 338 and the output section on the left 339.

The intake section 338 comprises an intake vertical hole 340 through the whole extent of the section, blocked in the bottom cavity 337 by a flexable blade 341 fastened on the bottom plane of the intake section 338, opposite the intake hole 340, to allow the flexable blade 341 a downward movement.

The output section 339 comprises a vertical output hole 342 opposite the intake hole 341 leading downward into an oval chamber 343 contained through most of the length and width of the output section 339 with a vertical wall 344.

This chamber 343 wider than the output hole 342 extends further down, forming a second chamber 345 larger of similar form and with a vertical or a slightly slanted wall 346, to form a peripheral top edge 347.

This second chamber 346 is fitted with a plug plate 348 of identical form and thickness and is pressed against the edge 347 over a gasket.

The plug plate 348 contains an output vertical hole 349 toward one end of the larger extent blocked by an output flexable blade 348 opposite the output hole 342.

The output flexable blade 350, capable of moving upward, allows the plug plate hole 349 to communicate with the smaller oval chamber 343 and with the output hole 342.

A pressure plate 351 fitted in the bottom cavity 337, pressed by the valve block 313 screwed on the protrusion 312 of the jacket 308 over a top and bottom gasket 352 to hold the plug plate 348 in its place and to pressure tight the valve block 313.

The pressure plate 351 is of considerable thickness and contains a hole 353 to communicate with the output hole 349 in the plug plate 348 and the smaller cylinder 311 and a slot 354 to clear the downward movement of the intake blade 341 and to communicate with the intake hole 340 and the smaller cylinder 311.

The eccentric pump, in this manner, will work efficiently on low revolutions, giving an output greater than that required for the function of an actuating cylinder and a power greater than that required to compress the spring or springs of an accumulator.

A complete mechanical system can be placed standing on any of its side in a pan, FIG. 23, enclosed by four vertical walls 355 extended downward in a triangular form 356 and joined together in a pyramidal shape with a square apex 357 to contain lubricating oil.

A pump 358, connected to the mechanical system, will intake oil from the pan through a filter 359 mounted on the bottom of the pan.

The pump will force oil in the pipes 360 with many perforations to cause a spray or a flow of oil on all parts of the mechanical system.

A moveable window can be screw mounted on a triangular side for changing the filter.

I claim:

1. An appartus for converting hydraulic power to rotational power, said apparatus comprising:
   a support base;
   a source of hydraulic fluid;
   a pair of piston and cylinder assemblies in communication with said source of hydraulic fluid and mounted to said support base such that the pistons thereof are generally parallel with one another but extending substantially opposite directions;
   means for alternately directing hydraulic fluid to each of said piston and cylinder assemblies;
   a plurality of lazy tong assemblies comprising a first lazy tong assembly, a last lazy tong assembly and an intermediate lazy tong assembly, each said lazy tong assembly comprising at least one block slidably mounted in proximity to said support base and at least one pair of lazy tongs with each said lazy tong having a pair of opposed ends, one said end of each said lazy tong being pivotably connected to said block, the opposed ends of the lazy tongs in said first lazy tong assembly being connected respectively to said pistons, said first and intermediate lazy tong assemblies each further comprising at least one pair of levers each of which comprises a pair of opposed ends, one end of each said lever being pivotably connected to the block of the associated lazy tong assembly, the opposed ends of said levers in said first and intermediate lazy tong assemblies being pivotably connected respectively to said intermediate and last lazy tong assemblies at locations on selected respective lazy tongs thereof remote from the respective blocks, said levers further being pivotably mounted to said support base at locations intermediate the opposed ends of said levers;
   a drive shaft rotatably mounted in proximity to the block of said last lazy tong assembly and in rolling engagement therewith, whereby the hydraulically powered movement of said pistons causes alternate expansion and collapsing of the lazy tongs, and whereby the movement of said lazy tongs causes a corresponding movement of said blocks for rotatably driving the drive shaft.

2. An apparatus as in claim 1 further comprising a plurality of tracks securely mounted to said support base, said tracks being operative to guide said blocks in generally linear directions generally parallel to one another.

3. An apparatus as in claim 2 wherein the intermediate lazy tong assembly comprises a plurality of blocks, a plurality of pairs of lazy tongs and a plurality of pairs of levers.

4. An apparatus as in claim 2 wherein the block of at least the last lazy tong assembly comprises at least two rackets having a plurality of gear teeth thereon and wherein the drive shaft comprises at least two generally circular clutch gears in engagement with said racks, whereby the racks move with the block and rotatably drive the drive shaft.

5. An apparatus as in claim 4 wherein the racks are disposed on opposite sides of said gears.

6. An apparatus as in claim 2 wherein the block of at least the last lazy tong assembly comprises at least two chains, and wherein the drive shaft comprises at least two circular clutch gears in engagement with the chains, whereby the chains move with the block and rotatably drive the entire shaft.

7. An apparatus as in claim 1 further comprising an accumulator in communication with said source of hydraulic fluid and a low revolution eccentric pump in communication with said accumulator, said pump being operative to force hydraulic fluid from said source into said accumulator.

8. An apparatus as in claim 7 wherein the accumulator further comprises a volume control means for diverting hydraulic fluid from said accumulator after a selected volume of hydraulic fluid has been received.

9. An apparatus as in claim 8 wherein the volume control means of said accumulator comprises a solenoid switch.

10. An apparatus as in claim 7 wherein said accumulator further comprises a piston slidably disposed therein and a spring means in communication with said piston, said piston and said spring means being operative to keep the hydraulic fluid in said accumulator under pressure.

11. An apparatus as in claim 1 wherein the plurality of lazy tong assemblies are disposed in parallel relationship to one another and define a plurality of generally planar arrays of lazy tong assemblies, said arrays being disposed in parallel relationship to one another.

12. An apparatus as in claim 11 wherein each array of lazy tong assemblies comprises three lazy tong assemblies.

13. An apparatus as in claim 1 further comprising a mechanical actuator in communication with at least one said piston and cylinder assembly for mechanically initiating the operation thereof.

* * * * *